June 23, 1936.       C. D. BOLIN       2,045,289
THERMOSTATIC VALVE CONTROL
Filed July 19, 1934       2 Sheets-Sheet 1

INVENTOR:
Charles D. Bolin,
by Carlton Gravely,
HIS ATTORNEYS.

June 23, 1936.  C. D. BOLIN  2,045,289
THERMOSTATIC VALVE CONTROL
Filed July 19, 1934  2 Sheets-Sheet 2
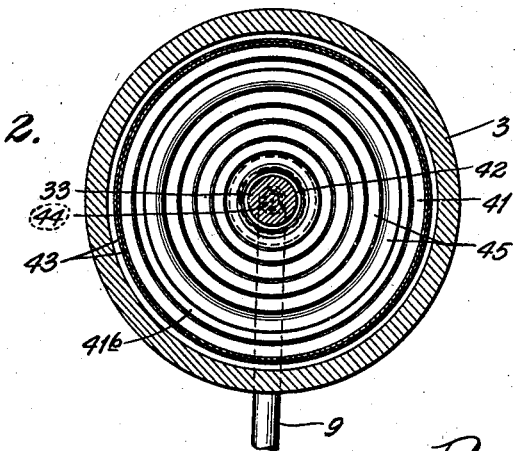
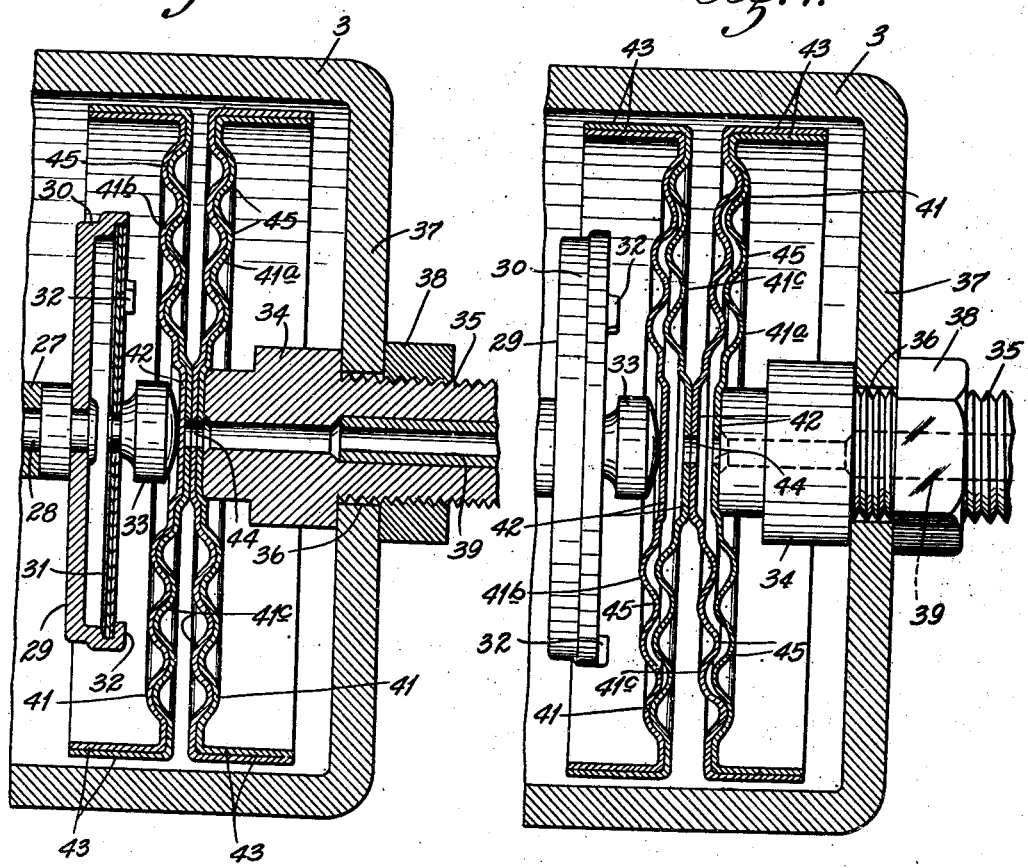
Charles D. Bolin,
by Carl Van Gravely,
INVENTOR
HIS ATTORNEYS Patented June 23, 1936

2,045,289

UNITED STATES PATENT OFFICE 2,045,289

THERMOSTATIC VALVE CONTROL

Charles D. Bolin, St. Louis, Mo., assignor to American Thermometer Company, St. Louis, Mo., a corporation of Missouri Application July 19, 1934, Serial No. 736,020

10 Claims. (Cl. 236—99)

My invention relates to thermostats of the type actuated by an expansive fluid. It is especially adapted for use in controlling the temperature of gas ovens.

The invention has as its principal object a device that is simple and compact in construction, that is sensitive in operation, that is not attacked by the expansive fluid and that has a long life. Other objects and advantages will appear hereinafter.

The present invention may be said to be an improvement, as to the thermostatic control device and the compensating device therefor, over the invention set forth in my co-pending application Serial No. 696,757. The present invention embodies many of the features set forth in said copending application and includes all of the advantages of said invention, as well as having important additional advantages of its own.

The invention consists in the thermostatic valve control and in the parts and combinations and arrangements of parts hereinafter described and claimed.

In the accompanying drawings, which form part of this specification, and wherein like numerals refer to like parts wherever they occur, Fig. 1 is a sectional view of a thermostat for a gas oven embodying my invention;

Fig. 2 is a sectional view on the line 2—2 in Fig. 1;

Fig. 3 is a fragmentary sectional view on an enlarged scale, showing the thermostatic disks at normal temperature; and Fig. 4 is a view similar to Fig. 3 showing the disks as separated by an increase in temperature.

Figure 1:
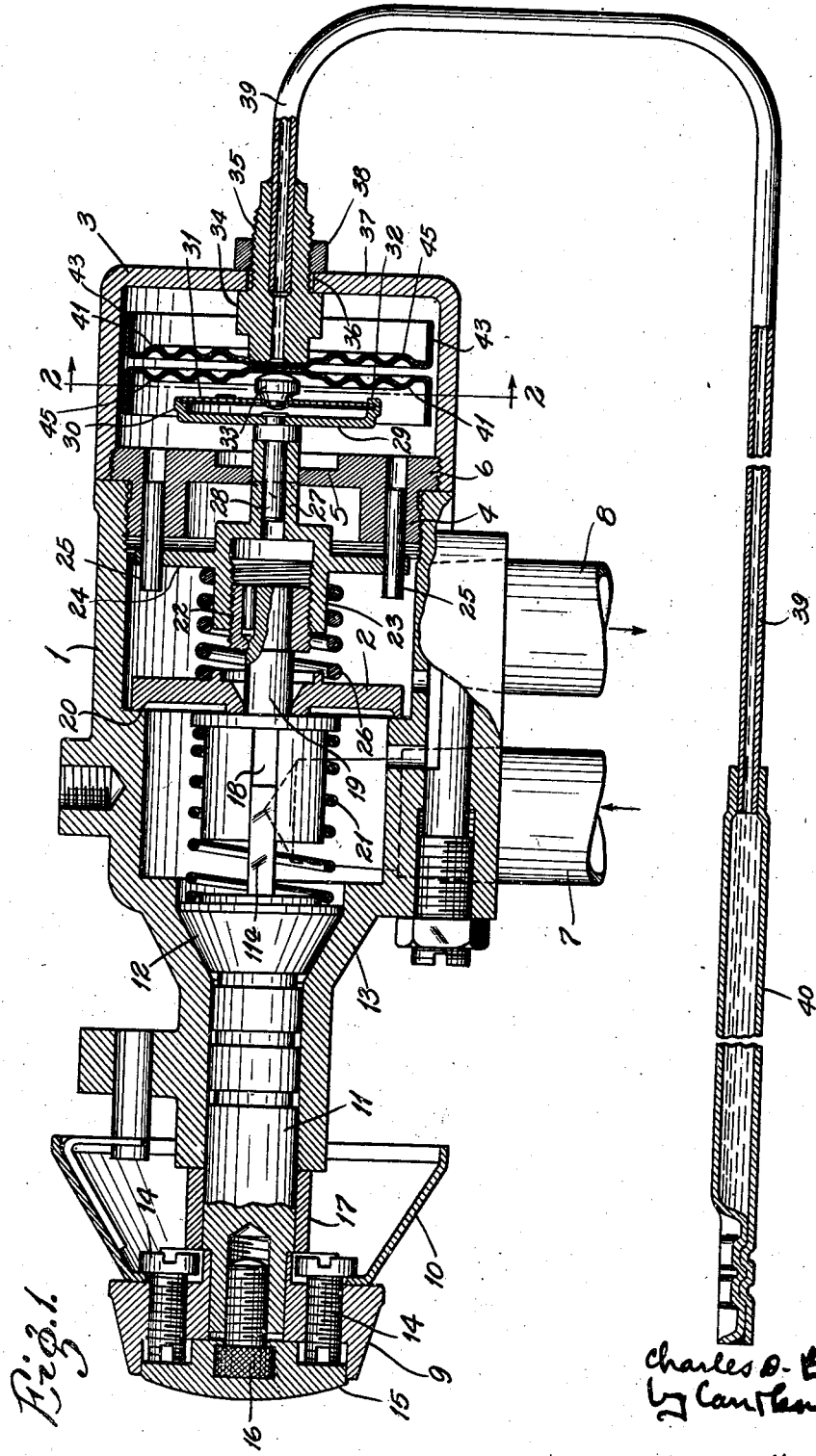

The drawings illustrate a front housing section 1 containing a valve 2 for controlling the flow of gas through the housing and a rear housing section 3 containing thermostatically controlled mechanism for operating said valve. Into the end of the front housing section is threaded a sleeve 4 that has a closed end 5 and an annular flange 6 partly overlapping the end wall of said front housing section 1, and the rear housing section 3 is threaded onto said flange 6 and abuts against the end of the front housing section 1. A pipe 7 leads from the gas manifold (not shown) into the inlet chamber of said housing on one side of said valve 2; and a pipe 8 leads from the outlet chamber of said housing on the other side of said valve 2, to the oven burner (not shown).

The operating knob 9 and a graduated indicating dial 10 showing temperatures from room temperature to the maximum cooking temperature, are secured on the projecting end of a rotary valve operating stem 11, which has a conical portion 12 seated in a tapered portion 13 of the front valve housing section 1. The knob 9 is shown as of hollow cup shape and having the dial 10 secured to its back face by means of screws 14. It is fixed on the valve operating stem 11 and a cover 15 therefor having a central screw 16 that is threaded into the end of said stem 11 secures said knob in place on the stem. A collar 17 is interposed between said knob 9 and the end of the front housing section 1.

The valve operating stem 11 has a projecting tongue 11a that fits in a slot or recess 18 formed in the enlarged end portion of a pin 19 that slidably supports said valve 2. Said valve cooperates with a shouldered seat 20 formed in said front housing section 1. A helical spring 21 interposed between the end of the valve operating stem 11 and said pin 19 urges said pin away from said stem and tends to lift said valve 2 off its seat 20. Said pin 19 has a threaded end portion 22 that extends into an interiorly threaded sleeve or nut 23 that has an annular flange 24 disposed in the front housing section. Said nut 23 and flange 24 are held against rotation by means of pins 25 that project from said housing sleeve into the flange 24 of said nut 23. A helical spring 26 is interposed between the valve 2 and said flange 24. The nut 23 has an axially projecting hollow plunger 27 that extends through a hole in the closed end 5 of said sleeve 4 at the end of the front housing section. In said plunger 27 is mounted a pin 28 on the end of which is a supporting plate 29 that has a peripheral shouldered flange 30 in which is mounted a disk of thermostatic metal 31, securing lugs 32 holding said thermostatic metal 31 in place. A contact button 33 having a rounded head portion is secured to said thermostatic disk as by riveting.

An axially bored stud 34 has a threaded reduced portion 35 that extends through an opening 36 in the end wall 37 of said rear housing section. A nut 38 on said stud permits it to be drawn up tight against the housing wall 37. Extending into said stud 34 is the end of a tube 39 whose other end extends into a metal container 40 that is mounted in the oven or other chamber to be heated and that contains the expansive fluid.

Mounted in the rear housing section 3 are pairs of nested corrugated disks 41 having flat middle portions 42. The disk 41a at one end of the series has its flat middle portion 42 secured, as by welding, to said stud 34, the disk 41b at the other end of the series has its flat middle portion 42 in engagement with the contact button 33 on said thermostatic compensating disk 31; and the middle disks 41c have their flat middle portions 42 welded together. Said disks 41 all have peripheral flanges 43, the flanges of the disks of a pair being nested and the nested flanges 43 of the two pairs extend in opposite directions, that is, the unflanged faces of the middle disks 41c oppose each other. The flanges 43 of each pair of disks are secured throughout their periphery by welding.

The endmost disk 41a that is secured to said stud 34 and the middle disks 41c have central openings 44 therethrough that communicate with the bore of said stud 34. Normally the two disks of a pair are in close contact with each other over their entire surfaces, the corrugations 45 of the disks 41 nesting closely together. When an increase in oven temperatures causes an expansion of the fluid in the container 40 and the tube 39, this fluid forces apart the two disks 41 of a pair, thus causing the endmost disk 41b that is in contact with the button 33 to move against said button, thus moving the valve operating mechanism into position to close the valve 2. Upon a decrease in temperature, the disks of each pair move back into contact with each other, expelling the liquid therefrom back into the stud and tube and permitting the valve 2 to open again.

The valve housing 1, 3 is commonly placed on a portion of the stove some distance from the oven but adjacent to a burner. Thus, the lighting of said burner will increase the temperature in the housing and cause an expansion of the fluid. This action would prevent the device from being solely responsive to the oven temperature. Accordingly, the thermostatic disk 31 is arranged to compensate for any movement of the thermostatic disks 41 that is responsive to the temperature in the vicinity of the housing.

The above described control disks and compensating control disk are of simple and durable construction and they are quite sensitive in operation. Only slight movement of the corrugated disks is required. The closure in the front housing section 1 keeps gas from entering the rear housing section 3 that contains the thermostatic devices. Obviously, numerous changes (particularly in the valve operating devices) may be made without departing from the invention and I do not wish to be limited to the precise construction shown.

What I claim is:

1. A thermostatic device comprising two pairs of nested corrugated flexible disks, the disks of each pair having overlapping peripheral flanges welded together, the middle disks abutting at their middles and being welded together, an axially bored stud welded to the middle portion of one of said disks, said disk and said middle disks having central perforations, and a supply of heat responsive fluid, whereby the disks of each pair are normally in contact with each other but are separated when heat forces said fluid into the spaces between disks.

2. A thermostatic device comprising two pairs of nested corrugated flexible disks, the disks of each pair having overlapping peripheral flanges welded together, the pairs of disks being arranged with the unflanged faces of the middle disks opposing each other and abutting at their middles, said abutting portions being welded together, an axially bored stud welded to the middle portion of one of said disks, said disk and said middle disks having central perforations, and a supply of heat responsive fluid, whereby the disks of each pair are normally in contact with each other but are separated when heat forces said fluid into the spaces between disks.

3. A thermostatic device comprising two pairs of nested corrugated flexible disks of stainless steel, the disks of each pair having overlapping peripheral flanges welded together, the middle disks abutting at their middles and being welded together, an axially bored stud of stainless steel welded to the middle portion of one of said disks, said disk and said middle disks having central perforations, and a supply of heat responsive fluid, whereby the disks of each pair are normally in contact with each other but are separated when heat forces said fluid into the spaces between disks.

4. A thermostatic device comprising two pairs of nested corrugated flexible disks of stainless steel, the disks of each pair being of equal thickness and having overlapping peripheral flanges welded together, the pairs of disks being arranged with the unflanged faces of the middle disks opposing each other and abutting at their middles, said abutting portions being welded together, an axially bored stud welded to the middle portion of one of said disks, said disk and said middle disks having central perforations, and a supply of heat responsive fluid, whereby the disks of each pair are normally in contact with each other but are separated when heat forces said fluid into the spaces between disks.

5. A thermostatic device comprising two pairs of nested corrugated disks, the disks of each pair having overlapping peripheral flanges welded together, the pairs of disks being arranged with the unflanged faces of the middle disks opposing each other and abutting at their middles, said abutting portions being welded together, an axially bored stud welded to the middle portion of one of said disks, said disk and said middle disks having central perforations, a supply of heat responsive fluid, whereby the disks of each pair are normally in contact with each other but are separated when heat forces said fluid into the spaces between disks, a compensating thermostatic disk adjacent to the disk remote from said stud and a contact member on said compensating disk freely engaging said thermostatic disk.

6. A thermostatic control device comprising a housing having a front section provided with inlet and outlet chambers, a valve for controlling communication between said chambers, a sleeve threaded in the end of said front section and having a closed end and a peripheral threaded flange overlapping said front housing section, said housing also having a rear section screwed on said flange, a plunger operatively connected with said valve and extending through a hole provided therefor in said sleeve end, a thermostatic metal plate carried by said plunger, a member adjacent to said thermostatic member and movable by the heat of a remote chamber, and a member on said thermostatic metal plate, freely engaging said adjacent member.

7. A thermostatic control device comprising a housing provided with inlet and outlet chambers, a valve for controlling communication between said chambers, a plunger operatively connected with said valve, a thermostatic metal plate carried by said plunger, two pairs of nested corrugated disks, the disks of each pair having overlapping peripheral flanges welded together, the pairs of disks being arranged with the unflanged faces of the middle disks opposing each other and abutting at their middle, said abutting disks being welded together, an axially bored stud welded to the middle portion of one of said disks, said disk and said middle disks having central perforations, a supply of heat responsive fluid, whereby the disks of each pair are normally in contact with each other but are separated when heat forces said fluid into the spaces between disks, and a member on said thermostatic metal plate, freely engaging one of said corrugated disks.

8. A thermostatic control device comprising a housing having a front section provided with inlet and outlet chambers and a rear section, a valve for controlling communication between said chambers, a plunger operatively connected with said valve, a thermostatic metal plate carried by said plunger, two pairs of nested corrugated disks, the disks of each pair having overlapping peripheral flanges welded together, the pairs of disks being arranged with the unflanged faces of the middle disks opposing each other and abutting at their middle, said abutting disks being welded together, an axially bored stud welded to the middle portion of one of said disks, said disk and said middle disks having central perforations, a supply of heat responsive fluid, whereby the disks of each pair are normally in contact with each other but are separated when heat forces said fluid into the spaces between disks, and a member on said thermostatic metal plate, freely engaging one of said corrugated disks, said rear housing section having an opening through its end and said stud having a reduced threaded portion projecting through said opening and a nut on said stud for drawing it tight against the end of said housing section.

9. A device of the kind described comprising pairs of nested corrugated flexible disks, the disks of each pair having overlapping peripheral flanges welded together and disks of adjacent pairs abutting against each other and being secured together at their middles.

10. In a thermostatic device, a pair of nested corrugated flexible disks having overlapping peripheral flanges welded together, an axially bored stud welded to the middle portion of one of said disks, said disk having a central opening communicating with the bore of said stud, and a supply of heat responsive fluid for the bore of said stud, whereby said disks are normally in contact with each other over their entire surface but are separated when heat forces said fluid into the spaces between said disks.

CHARLES D. BOLIN.